UNITED STATES PATENT OFFICE.

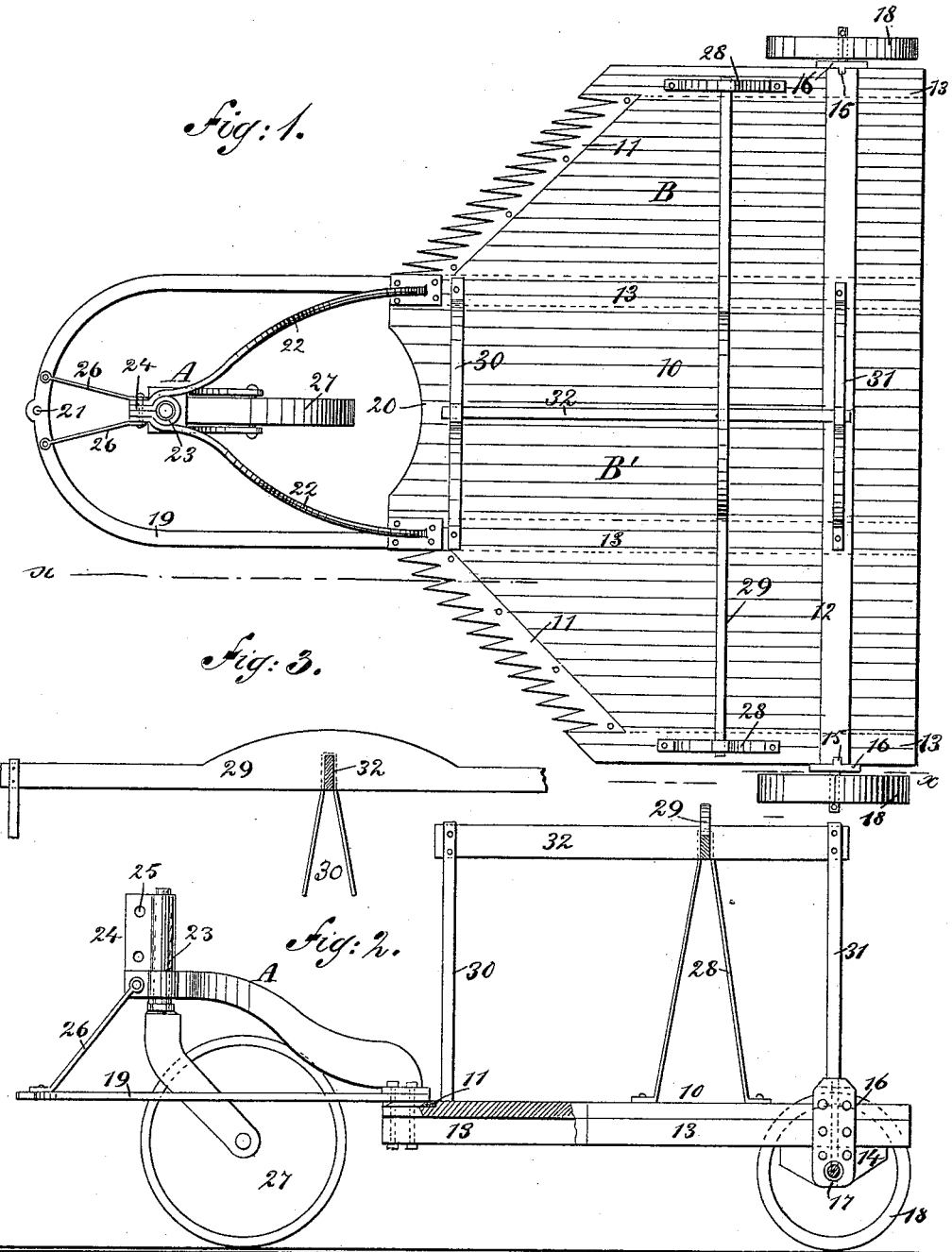

JOHN BARDILL, OF GRANT FORK, ILLINOIS.

CORN-HARVESTER.

SPECIFICATION forming part of Letters Patent No. 459,987, dated September 22, 1891.

Application filed March 17, 1891. Serial No. 385,364. (No model.)

*To all whom it may concern:*

Be it known that I, JOHN BARDILL, of Grant Fork, in the county of Madison and State of Illinois, have invented a new and useful Improvement in Corn-Harvesters, of which the following is a full, clear, and exact description.

My invention relates to an improvement in corn-harvesters, and has for its object to provide an implement of exceedingly simple and economic construction and to so construct the implement that the cut stalks will form upon the platform in two stacks independently supported, and also to provide guard-rails for the protection of the attendants and so located as to effectually prevent said attendants from being thrown or from falling upon the knives.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the implement. Fig. 2 is a longitudinal section taken practically on the line $x\ x$ of Fig. 1, and Fig. 3 is a detail view illustrating the construction of the guard-rails.

The body of the implement consists of a platform 10, the forward edges of which at each side of the center are inclined rearward in opposite directions, and upon the inclined portion of the platform knives 11, of any approved construction, are located. A beam 12 is secured upon the upper face of the platform near its rear end, which beam extends from side to side of said platform, as illustrated in Fig. 1. The platform is braced by a series of beams 13, said beams being located, preferably, one near each side edge and one at each side of the center. The beams are of sufficient length to extend from front to rear of the platform and are secured to the under face thereof.

Immediately beneath the ends of the upper beam 12, which may be termed an "axle-beam," blocks 14 are rigidly secured to the under surface of the outer or side supporting-beams 13, and in the outer faces of the blocks and side beams 13 and in the extremities of the axle-beam 12 a vertical groove is produced adapted to receive ribs 15, formed upon the back of plates 16, which plates are adjustably secured to the blocks and the side beams, as shown in Fig. 2. Each of the plates 16 has an axle 17, projected horizontally from its outer face at or near the lower end, and upon the axles the rear supporting-wheels 18 of the implement are journaled.

The inner ends of a horizontal yoke 19 are bolted or otherwise secured to the upper face of the platform 10, one member of the yoke being located at each side of the center of the platform adjacent to the inner ends of the knives 11, as shown in Fig. 1. The yoke extends outward from the forward end of the platform, and the front edge of the latter between the members of the yoke is preferably provided with a concavity or recess 20.

In the center of the bow portion of the yoke 19 an eye 21 is preferably produced to facilitate the attachment of a singletree or shaft. The members 22 of an upward and outward curved bifurcated arm A are bolted to the platform, the members of the arm at their inner ends being preferably located immediately over the inner ends of the yoke members, and the same bolt securing the yoke to the platform may be utilized to attach the curved arm A.

The arm at its forward end is provided with an upward-extending vertical sleeve 23, which sleeve is fitted to and secured in an eye formed in the arm. The outer ends of the arm are preferably flat, and the sleeve 23 is provided with a longitudinal rib or flange 24, clamped by the flattened portions of the arm. In the flattened portions of the arm and in the rib or flange of the sleeve apertures 25 are made, and brace-rods 26 are attached to the forward portion of the yoke 19 and to the arm A, preferably through the medium of bolts passed through one of the apertures 25.

In the sleeve 23 of the arm A the stem of a caster-wheel 27 is pivoted. When the implement is thus supported by the caster-wheel at the front and the two wheels at the back, the implement may be quickly and shortly turned and is under complete control.

Vertical standards 28 are secured upon the platform 10, one at each side, the location of the standards being preferably between the axle-beam 12 and the inclined forward edge. The standards 28 are in transverse alignment and support the extremities of a guard-rail 29, the said rail being preferably made of greatest thickness at its central portion. Standards 30 and 31 are also secured upon the platform, one being preferably located upon the axle-beam 12 and the other at the forward end of the platform immediately in rear of the horizontal yoke 19.

In the upper ends of the standards 30 and 31 the extremities of a transverse guard-rail 32 are supported, the said guard-rail 32 being preferably made to pass through an opening in the central portion of the guard-rail 29. By providing the platform with the guard-rails just described separate compartments B and B' are obtained at the back of the knives, and separate rear compartments are also formed, in each of which an attendant is ordinarily stationed.

In the operation of the implement, as it is drawn forward between the rows of corn, the knives sever the stalks in their path and the stalks fall into the compartments B and B' against the intersecting guard-rails 29 and 32 and form themselves into two independent stacks, which may be readily removed by the attendants at the back of the compartments. It will be observed that the longitudinal and transverse guard-rails effectually prevent the possibility of the attendants falling upon the knives or of being thrown thereon.

Having thus described my invention, I claim as new and desire to secure by Letters Patent—

1. In a corn-harvester, the combination, with the wheeled platform 13, having rearward-inclined cutters at opposite sides of the center of its forward edge, of the longitudinally-aligned front and rear standards 30 31 on said platform, the rail 32, connecting the upper ends of the standards, the transversely-aligned standards 28 at opposite sides of the platform between the ends thereof, and the transverse rail 29, connecting the upper ends of standards 28, said crossing-bars 32 29 forming stalk-receiving compartments B B' at the front portion of the platform and spaces for the operators at the rear of the platform, substantially as set forth.

2. In a corn-harvester, the combination, with the cutter-carrying platform or frame having the side wheels 18, of the central horizontal yoke 19, bolted at its inner ends to the front of the frame and having an eye 21 in its forward end, the bifurcated arm A, projecting forward from the platform above the yoke and having its outer ends apertured, the vertical sleeve 23, having vertical ribs or flanges 24 held between said apertured yoke ends, bolts passing through said apertures and securing the yoke and sleeve together, the braces 26, connecting the yoke and bifurcated arm at their forward ends, and a caster-wheel having a pintle mounted in said sleeve, substantially as set forth.

JOHN BARDILL.

Witnesses:
JOHN ZIMMERMAN,
MARTIN RUCH, Jr.